United States Patent
Lee et al.

(10) Patent No.: US 11,993,251 B2
(45) Date of Patent: May 28, 2024

(54) METHOD AND SYSTEM FOR CONTROLLING ENGINE CLUTCH OF P2 TYPE PARALLEL HYBRID VEHICLE

(71) Applicant: HYUNDAI KEFICO CORPORATION, Gyeonggi-do (KR)

(72) Inventors: Jun-Hyung Lee, Gyeonggi-Do (KR); Jung-Mook Choo, Seoul (KR); Young-Ho Jun, Seoul (KR); Hyun-Ki Shin, Gyeonggi-do (KR); Hyung-Jin Shin, Seoul (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 374 days.

(21) Appl. No.: 17/590,769

(22) Filed: Feb. 1, 2022

(65) Prior Publication Data
US 2022/0250609 A1 Aug. 11, 2022

(30) Foreign Application Priority Data
Feb. 5, 2021 (KR) .......................... 10-2021-0016954

(51) Int. Cl.
*B60W 20/40* (2016.01)
*B60K 6/48* (2007.10)
(Continued)

(52) U.S. Cl.
CPC .............. *B60W 20/40* (2013.01); *B60K 6/48* (2013.01); *B60W 10/02* (2013.01); *B60W 10/06* (2013.01);
(Continued)

(58) Field of Classification Search
CPC .. B60W 60/0053; B60W 20/40; B60W 40/09; B60W 40/13; B60W 2510/081; B60W 2510/10
See application file for complete search history.

(56) References Cited

U.S. PATENT DOCUMENTS

| 5,557,521 A * | 9/1996 | Danz ................... F16H 61/0213 706/900 |
| 9,956,948 B2 * | 5/2018 | Geller ................... B60W 30/19 |

(Continued)

FOREIGN PATENT DOCUMENTS

| KR | 10-2009-0099843 A | 9/2009 |
| KR | 2009-0111175 A | 10/2009 |

(Continued)

*Primary Examiner* — Ramsey Refai
(74) *Attorney, Agent, or Firm* — Fox Rothschild LLP (57) ABSTRACT

A method and system for controlling an engine clutch of a P2 type parallel hybrid vehicle includes steps of: determining whether or not a learning mode entry condition is satisfied, depending on whether or not a kickdown shift occurs during performance of variable hydraulic control of an engine clutch and based on the degree to which slip of the engine clutch occurs, deriving and storing a learning hydraulic value for suppressing the slip that is to occur when the kickdown shift occurs during the performance of the variable hydraulic control in such a manner that the slip does not occur, when a vehicle state satisfies a predetermined learning mode entry condition, and computing a final hydraulic pressure by adding a hydraulic compensation value to a target hydraulic pressure, when the same kickdown shift situation occurs, and controlling the engine clutch using the computed final hydraulic pressure.

13 Claims, 3 Drawing Sheets

(51) Int. Cl.
  *B60W 10/02* (2006.01)
  *B60W 10/06* (2006.01)
(52) U.S. Cl.
  CPC ............... *B60K 2006/4825* (2013.01); *B60W 2510/0216* (2013.01); *B60W 2510/025* (2013.01); *B60W 2510/0657* (2013.01); *B60W 2510/107* (2013.01); *B60W 2510/1075* (2013.01); *B60W 2710/026* (2013.01)

(56) References Cited

U.S. PATENT DOCUMENTS

2015/0088348 A1* 3/2015 Lee ..................... B60W 20/40
                                                     180/65.265
2015/0166052 A1* 6/2015 Lee ..................... B60W 20/40
                                                     903/946

FOREIGN PATENT DOCUMENTS

KR   10-2010-0056943 A   5/2010
KR       2014-0078341 A   6/2014
KR         10-1588751 B1  1/2016

* cited by examiner

METHOD AND SYSTEM FOR CONTROLLING ENGINE CLUTCH OF P2 TYPE PARALLEL HYBRID VEHICLE

CROSS REFERENCE TO RELATED APPLICATION

The present application claims under 35 U.S.C. § 119(a) the benefit of Korean Patent Application No. 10-2021-0016954, filed Feb. 5, 2021, the entire contents of which are incorporated by reference herein.

BACKGROUND

(a) Technical Field

The present disclosure relates to a method and a system for controlling an engine clutch of a vehicle, more particularly, to the method and system for controlling the engine clutch of a P2 type parallel hybrid vehicle that is configured such that an engine, a motor, and a transmission that constitute a motive power system are arranged in a row, where the engine clutch is interposed between the engine and the motor to regulate transfer of motive power in a direction from the engine to the motor.

(b) Description of the Related Art

Generally, a hybrid vehicle refers to a vehicle that is driven by efficiently combining two or more different types of motive power sources. In most cases, the hybrid vehicle is driven with motive power supplied by an engine that runs on a compressed fuel-air mixture and by a battery-powered motor. This vehicle is referred to as a hybrid electric vehicle (HEV).

Hybrid electric vehicles have been extensively studied due to increased demand for improving fuel efficiency and developing more environmentally friendly vehicles. As is well known, the hybrid electric vehicles may be configured to employ various motive power transfer structures including an engine and a motor serving as motive power sources. Most of the hybrid electric vehicles currently under development employ one of parallel-type and series-type motive power transfer structures.

In the parallel-type motive power transfer structure, the engine is used only for power generation and the motor is used only for driving the vehicle. An advantage of the series-type motive power transfer structure over the parallel-type motive power transfer structure is that it has a relatively simple structure and a simple control logic. However, in the series-type motive power transfer structure, mechanical energy from the engine is converted into electric energy for being stored in a battery, and the vehicle is driven by the motor powered by electricity from the battery. For this reason, the series-type motive power transfer structure has a disadvantage in terms of efficiency in energy conversion.

By contrast, a disadvantage of the parallel-type motive power transfer structure over the series-type motive power transfer structure is that it has a relatively complex structure and a complex control logic. However, in the parallel-type motive power transfer structure, the mechanical energy from the engine and the electric energy of the battery can be used at the same time. For this reason, the parallel-type motive power transfer structure has an advantage in terms of the efficient use of the energy. In addition, the hybrid electric vehicle can be designed without a major change in a drive system of an existing internal combustion engine, thereby decreasing a manufacturing cost. This advantage leads to the recent increase in development of parallel-type hybrid electric vehicles.

A typical example of the parallel-type hybrid electric vehicle is a mild hybrid vehicle in which the motor assists the engine in providing motive power. Mild hybrid types are categorized into P0, P1, P2, P3, P4, and so on types, depending on a position that the motor (which, in a mild hybrid vehicle, is referred to as a mild hybrid starter & generator (MHSG)) takes up within a motive power system of the vehicle.

Figure 1:
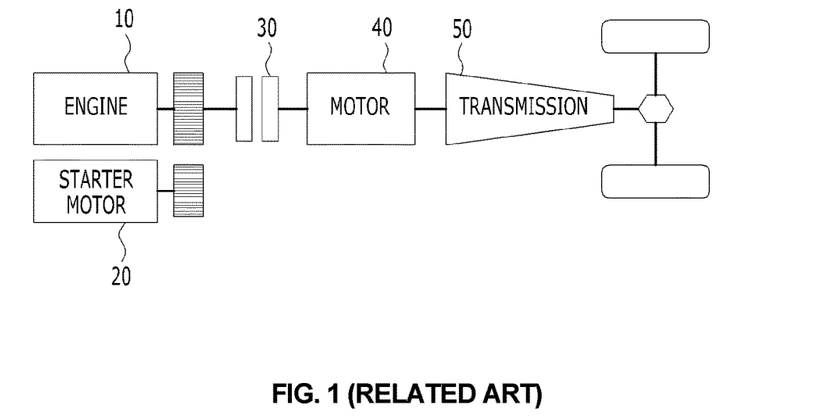
FIG. 1 (RELATED ART) is a schematic view illustrating a motive power transfer structure of a P2 type parallel hybrid vehicle in the related art.

Of these types of hybrid vehicles, a P2 type mild hybrid vehicle, as illustrated in FIG. 1 (RELATED ART), refers to a vehicle that is configured in such a manner that an engine 10, a motor 40, and a transmission 50 that constitute a motive power system are arranged in a row, with an engine clutch 30 interposed between the engine 10 and the motor 40, to regulate transfer of motive power from the engine 10 to the motor 40. Thus, the vehicle is equipped with a system in which an output of the motor 40 and an output of the engine 10 are transferred to an axle.

For reference, a motive power transfer type illustrated in FIG. 1 is applied not only to the P2 type mild hybrid vehicle, but also to a general parallel-type hybrid vehicle in the same manner.

Reference numeral 20 depicts a starter motor. The starter motor 20 is a motor capable of producing motive power and generating electricity. The starter motor 20 provides drive power for starting the engine 10. Depending on the situation, the starter motor 20 is driven by motive power of the engine 10 and thus generates electricity. The starter motor 20 may be coupled to the engine 10 using a mechanical power transfer device, such as a belt, a chain, or a gear. A coupling ratio between the starter motor 20 and the engine 10 be variously determined according to need.

The engine clutch 30 regulating the transfer of the motive power between the engine 10 and the motor 40 is a hydraulic clutch that operates using a hydraulic pressure. The engine clutch 30 allows or blocks the transfer of the motive power between the engine 10 and the motor 40 through an opening, slipping, closing, or lock-up operation by a hydraulic control actuator (HCA).

A P2 type parallel hybrid system in the related art, which is configured as described above, controls a torque generated from the engine 10 that is hydraulically transferred to the engine clutch 30 in order to be transferred to an axle. At this point, after a current state of the engine clutch 30, for example, an open state, a slip step, a close state, or a lock-up state, is precisely determined, control of the engine clutch 30, such as slip and synchronization control, has to be performed.

However, in the P2 type parallel hybrid system in the related art, during performance of variable hydraulic control of the engine clutch 30, slip may occur in the engine clutch 30 when a load on a vehicle is abruptly increased such as when the vehicle travels along an upward-inclined road, or when a kickdown shift occurs, such as when an operation for abrupt acceleration is performed. The slip in the engine clutch 30 is due to an abrupt change in the number of resolutions of the engine and in an engine torque. Thus, a decrease in acceleration takes place, and a sense of gear shifting is not properly yielded.

For reference, the "variable hydraulic control" is hydraulic control that is performed on the engine clutch 30. During the variable hydraulic control, the engine clutch is controlled with a maximum pressure in order to suppress the slip and a power loss due to the slip at a time when a gear shift is ended. Then, when keeping the engine torque constant as under a fixed-speed traveling situation results in low variability of the engine torque, a pressure for controlling the engine clutch is gradually decreased. Thus, energy loss due to application of an unnecessarily excessive hydraulic pressure is prevented.

The foregoing is intended merely to aid in the understanding of the background of the present disclosure, and is not intended to mean that the present disclosure falls within the purview of the related art that is already known to those skilled in the art.

SUMMARY

An objective of the present disclosure is to provide a method and a system for controlling an engine clutch of a P2 type parallel hybrid vehicle, the method and the system being capable of preventing slip of an engine clutch when a kickdown shift occurs during performance of variable hydraulic control of an engine clutch of a P2 type parallel hybrid vehicle.

According to an aspect of the present disclosure, there is provided a method of controlling an engine clutch of a P2 type parallel hybrid vehicle, the method including: (a) determining whether or not a learning mode entry condition is satisfied, depending on whether or not a kickdown shift occurs during performance of variable hydraulic control of an engine clutch of a P2 type parallel hybrid vehicle and based on the degree to which slip of the engine clutch occurs, (b) deriving and storing a learning hydraulic value for suppressing the slip that is to occur when the kickdown shift occurs during the performance of the variable hydraulic control of the engine clutch in such a manner that the slip does not occur in the next time same kickdown shift situation, when a vehicle state satisfies a predetermined learning mode entry condition, and (c) computing a final hydraulic pressure by adding a hydraulic compensation value, obtained by multiplying the learning hydraulic value by a compensation factor, to a target hydraulic pressure, when the same kickdown shift situation occurs during the performance of the next time variable hydraulic control of the engine clutch, and controlling the engine clutch using the computed final hydraulic pressure.

In the method, in the step (a), during the performance of the variable hydraulic control of the engine clutch of the vehicle, when the kickdown shift occurs and when an amount of slip of the engine clutch is at or above a first setting value, it may be determined that the learning mode entry condition is satisfied.

In the method, the step (b) may further include: (b-1) capturing a gear shift progress step at a learning entry point in time and an engine torque; (b-2) updating a maximum amount of slip when an amount of slip of the engine clutch computed from a difference between the number of resolutions of an engine and the number of resolutions of a P2 motor is larger than a previous maximum amount of slip during the kickdown shift and storing a value resulting from the updating as an engine clutch slip learning value; (b-3) capturing a gear shift progress step at a learning ending point in time at which the amount of the slip of the engine clutch falls at or below a second setting value; and (b-4) determining a learning hydraulic value corresponding to the engine clutch slip learning value at the step (b-2) from a dedicated map.

In the method, in the step (b-3), when the amount of the slip of the engine clutch does not fall at or below the second setting value, returning to the immediately preceding step (b-2) may take place, and the step (b-2) and the subsequent steps may be repeatedly performed.

In the method, when the same kickdown shift occurs during the performance of the next time variable hydraulic control of the engine clutch, in the step (c), the final hydraulic pressure may be applied in a gear shift section that is the same as a gear shift section from the gear shift progress step at the previous learning entry point in time to the gear shift progress step at the learning ending point in time, and thus the engine clutch may be controlled.

In the method, the compensation factor may include an engine torque factor, and an oil temperature factor.

In the method, the engine torque factor may be a ratio between a current engine torque and an engine torque at a learning entry point in time (a current engine torque to an engine torque at a learning entry point in time), and the oil temperature factor may be determined from an oil temperature map in which compensation factors, serving as factors for compensating a delay in a response speed of the engine clutch due to an oil temperature, are stored as values that vary with an oil temperature section.

According to another aspect of the present disclosure, there is provided a system for controlling an engine clutch of a P2 type parallel hybrid vehicle in which an engine, a motor, and a transmission are arranged in a row and in which an engine clutch is mounted between the engine and the motor, the system including: a clutch actuator providing a hydraulic pressure necessary to drive the engine clutch; a torque measurement unit measuring a torque of the engine; an oil temperature measurement unit measuring an oil temperature inside the engine clutch; and a controller computing a target hydraulic pressure to be applied to the engine clutch from pieces of information provided by the engine torque measurement unit and the oil temperature measurement unit and controlling operation of the clutch actuator based on the computed target hydraulic pressure, wherein the controller derives a learning hydraulic value for suppressing slip, through learning and stores the derived learning hydraulic value, when a kickdown shift occurs during performance of variable hydraulic control of the engine clutch and when the slip having a predetermined value (a first setting value) or above occurs in the engine clutch, and the controller computes a final hydraulic pressure by adding a hydraulic compensation value, obtained by multiplying the learning hydraulic value by a compensation factor, to a target hydraulic pressure, when the same kickdown shift situation occurs during the performance of the next time variable hydraulic control of the engine clutch, and controls the engine clutch using the computed final hydraulic pressure.

In the system, the controller may capture a gear shift progress step at a point in time when the kickdown shift occurs and when slip having a predetermined value (a first setting value) or above occurs in the engine clutch during the performance of the variable hydraulic control of the engine clutch and captures an engine torque, the controller may update a maximum amount of slip when an amount of slip of the engine clutch computed from a difference between the number of resolutions of an engine and the number of resolutions of a P2 motor is larger than a previous maximum amount of slip during the kickdown shift and may store a value resulting from the updating as an engine clutch slip learning value, the controller may capture a gear shift progress step at a learning ending point in time at which the amount of the slip of the engine clutch falls at or below a predetermined value (a second setting value), and the controller may retrieve a hydraulic value corresponding to the engine clutch slip learning value from a dedicated map and may determine the retrieved hydraulic value as the learning hydraulic value.

In the system, the controller may repeat a process in which the amount of the slip of the engine clutch is recomputed when the amount of the slip of the engine clutch does not fall at or below the predetermined value (the second setting value), and in which a maximum amount of the slip is updated and a value resulting from the updating is stored as an engine clutch slip learning value, when the computed amount of the slip of the engine clutch is larger than a previous maximum amount of the slip.

In the system, when the same kickdown shift situation occurs during the performance of the next time variable hydraulic control of the engine clutch, the controller may apply the final hydraulic pressure in a gear shift section that is the same as a gear shift section from the gear shift progress step at the point in time when the slip having the predetermined value (the first setting value) or above occurs to the gear shift process step at the learning ending point in time, and thus may control the engine clutch.

In the system, the compensation factor may include an engine torque factor, and an oil temperature factor.

In the system, the engine torque factor may be a ratio between a current engine torque and an engine torque at a learning entry point in time (a current engine torque to an engine torque at a learning entry point in time), and the oil temperature factor may be determined from an oil temperature map in which compensation factors, serving as factors for compensating a delay in a response speed of the engine clutch due to an oil temperature, are stored as values that vary with an oil temperature section.

According to the present disclosure, during the performance of the variable hydraulic control of the engine clutch, when the kickdown shift occurs and when the slip occurs in the engine clutch, the compensation value (the hydraulic compensation value of the engine clutch) for preventing the slip in the next time same gear shift situation is derived through learning, and the compensation value is applied for engine clutch control in the next time same gear shift situation. Thus, the clip can be effectively prevented or can be in advance dealt with.

Accordingly, based on the slip in the previous gear shift situation, the method and the system for controlling an engine clutch of a P2 type parallel hybrid vehicle according to embodiments of the present disclosure in advance deal with the slip of the engine clutch that is to occur when the kickdown shift occurs during the performance of the variable hydraulic control. Thus, decreases in acceleration and drivability due to the slip of the engine clutch can be prevented, and gearshift quality can be improved.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Embodiments of the present disclosure will be described in detail below with reference to accompanying drawings in such a manner that a person of ordinary skill in the art to which the present disclosure pertains is enabled to practice them without undue experimentation.

The terms used hereinafter throughout the present specification are only for describing specific embodiments and are not intended to limit the present disclosure. The indefinite article "a/an" is used to mean one or more, not only one, except as distinctively expressed in context.

In addition, the terms first, second, and so on are used to describe various constituent elements, but should not be interpreted to impose any limitation on meanings thereof. These terms are used only to distinguish one element from another.

The same constituent elements are the same reference numbers, and descriptions thereof are not repeated. A detailed description of a related technology known in the art, when determined to unnecessarily make the nature and gist of the present disclosure unapparent, will be omitted.

Fundamentally, a method and a system for controlling an engine clutch of a P2 type parallel hybrid vehicle according to embodiments of the present disclosure are configured in such a manner that, when a kickdown shift occurs during performance of variable hydraulic control of an engine clutch in a P2 type parallel hybrid vehicle, a compensation value for preventing slip of the engine clutch is derived through learning and that the derived compensation value is reflected in a next time gear shift situation under the same condition.

Accordingly, the system for controlling an engine clutch of a P2 type parallel hybrid vehicle according to the embodiment of the present disclosure in advance deals with the slip of the engine clutch that is to occur when the kickdown shift occurs under a specific situation, particularly, during the performance of the variable hydraulic control. Thus, decreases in acceleration and drivability due to the slip of the engine clutch are prevented, and gearshift quality is improved.

For reference, the "variable hydraulic control" is hydraulic control that is performed on the engine clutch. During the variable hydraulic control, the engine clutch is controlled using a maximum pressure in order to suppress slip and a power loss due to the slip at a point in time when a gear shift is ended. Then, when as under a fixed-speed traveling situation, variability of the engine torque becomes low due to a constant engine torque, a pressure for controlling the engine clutch is gradually decreased. Thus, energy loss due to application of an unnecessarily excessive hydraulic pressure is prevented.

First, the system for controlling an engine clutch of a P2 type parallel hybrid vehicle according to the embodiment of the present disclosure will be described in detail with reference to the accompanying drawings.

Figure 2:
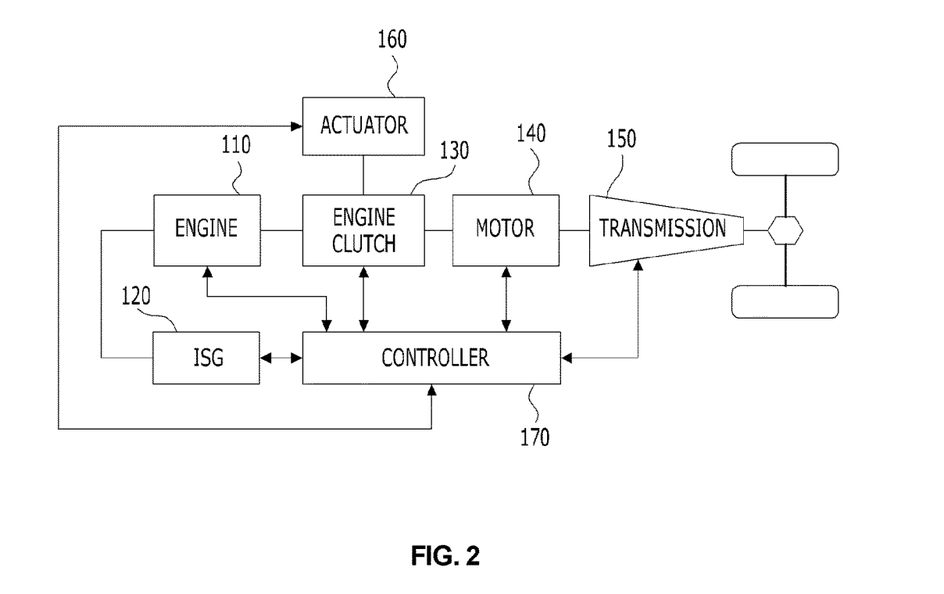
FIG. 2 is a schematic view illustrating configurations of essential components of the P2 type parallel hybrid vehicle including a system for controlling an engine clutch according to an embodiment of the present disclosure.
Figure 3:
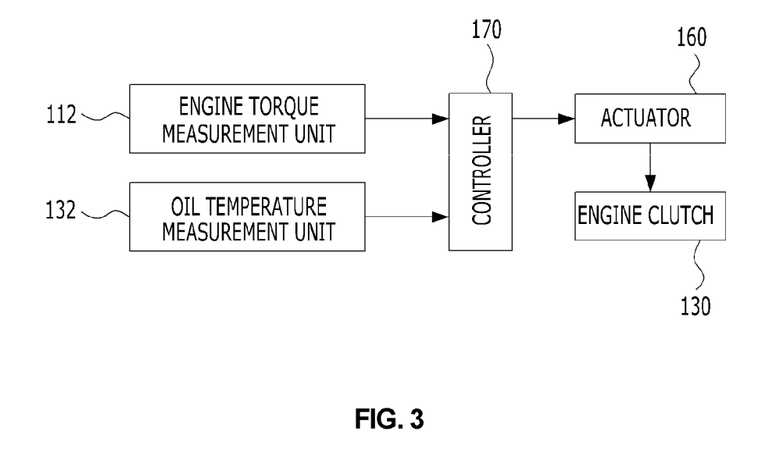
FIG. 3 is a view schematically illustrating a controller for engine clutch control and constituent elements in the vicinity thereof.

FIG. 2 is a schematic view illustrating configurations of essential components of a P2 type parallel hybrid vehicle including the system for controlling an engine clutch according to the embodiment of the present disclosure. FIG. 3 is a view schematically illustrating a controller for engine clutch control and constituent elements in the vicinity thereof.

With reference to FIGS. 2 and 3, fundamentally, the P2 type parallel hybrid vehicle in which a system for controlling an engine clutch according to an aspect of the present disclosure finds application is configured in such a manner that an engine 110, a motor 140, and a transmission that constitute a motive power system are arranged in a row, with an engine clutch 130 interposed between the engine 110 and the motor 140, to regulate transfer of motive power in a direction from the engine 110 to the motor 140.

An integrated starter and generator (ISG) 120 is coupled to the engine 110. The ISG 120 is a motor capable of producing motive power and generating electricity. The ISG 120 provides drive power for starting the engine 110. Depending on the situation, the ISG 120 is driven by motive power of the engine 110 and thus generates electricity. The ISG 120 may be coupled to the engine 110 using a mechanical power transfer device, such as a belt, a chain, or a gear. A coupling ratio between the ISG 120 and the engine 110 may be variously determined according to need.

The system for controlling a clutch control according to the embodiment of the present disclosure that finds application in the P2 type parallel hybrid vehicle includes an engine torque measurement unit 112 that measures torques of a clutch actuator 160 and the engine 110 and an oil temperature measurement unit 132 that measures an oil temperature inside the engine clutch 130. In addition, the system for controlling an engine clutch includes a controller 170 that computes a target hydraulic pressure to be applied to the engine clutch 130 from pieces of information provided by the engine torque measurement unit 112 and the oil temperature measurement unit 132.

For reference, the above-mentioned "controller" is a term that collectively refers to a control-related component equipped with one or more processors. The control-related component is programmed in such a manner that a sequence of steps for at least one function or processing operation is stepwise performed. According to the present disclosure, it is desirable that the term "controller" is understood to collectively perform functions of an engine control unit (ECU), a hydraulic control unit (HCU), and a transmission control unit (TCU) that are known in the art.

Under the control of the controller 170, the clutch actuator 160 provides a hydraulic pressure necessary to drive the engine clutch 130. To this end, based on the above-mentioned engine torque, oil temperature information, and the like, the controller 170 computes the target hydraulic pressure at an optimal level that is to be applied to the engine clutch 130. The controller 170 regulates or controls operation of the clutch actuator 160 in such a manner that the computed target hydraulic pressure can be applied to the engine clutch 130.

While the vehicle drives under low load, for example, in a case where, as under the fixed-speed traveling situation, the variability of the engine torque becomes low due to the constant engine torque. Thus, there is no need to control the engine clutch 130 using the maximum pressure (the target hydraulic pressure). The reason for this is because a load on the engine clutch 130 is lower than during driving a high load, such as when traveling along an upward inclined road, in a situation where the variability of the engine torque becomes low due to the constant engine torque.

Accordingly, based on output information (engine torque information) of the engine torque measurement unit 112 and the time for which the output information is continuously output, the controller 170 determines whether or not the vehicle drives under low load (whether or not a driving range where the variability of the engine torque is low is reached). When the result of the determination is that the vehicle drives under low load, the control unit 170 gradually decreases the hydraulic pressure applied to the engine clutch 130. Thus, the control unit 170 executes the variable hydraulic control that prevents energy loss due to an unnecessarily excessive hydraulic pressure.

However, during the performance of the variable hydraulic control, the slip may occur in the engine clutch 130 when a load on a vehicle is abruptly increased, such as when the vehicle travels along the upward-inclined road, or when the kickdown shift is performed, such as an operation for abrupt acceleration is performed. The reason for this is because when the kickdown is performed in a situation where the hydraulic pressure applied to the engine clutch 130 is gradually decreased by means of the variable hydraulic control, the number of engine revolutions and the engine torque, which cause the slip, are abruptly increased.

Accordingly, during the performance of the variable hydraulic control of the engine clutch 130, when the kickdown shift occurs and when the slip having a predetermined value (hereinafter referred to as a "first setting value") or above occurs in the engine clutch 130, the controller 170 performs a sequence of control steps in which a learning hydraulic value for suppressing the slip is derived through learning and is stored and in which a stored learning compensation value is reflected in a hydraulic pressure of the engine clutch 130 in the next time same gear shift situation.

To this end, the controller 170 may be equipped with one or more processors that operate according to a program that is preset to stepwise execute a sequence of control method steps described below.

The program may be a program that is written in such a manner as to control the engine clutch 130. According to the preset program, when the kickdown shift occurs during the performance of the variable hydraulic control and when the slip having the first setting value or above occurs in the engine clutch 130, the learning hydraulic value is derived through a sequence of learning steps described below, a hydraulic compensation value is obtained by multiplying the derived learning hydraulic value by a predetermined compensation factor, and a final hydraulic pressure is computed by adding the obtained hydraulic compensation value to the target hydraulic pressure. Thus, the engine clutch 130 is controlled.

Among programs that are executed by the processor with which the controller 170 is equipped, according to a program for deriving the learning hydraulic value, the following sequence of process steps may be executed.

① During the performance of the variable hydraulic control of the engine clutch 130, when the kickdown shift occurs and when the slip having the first setting value or above occurs in the engine clutch 130, a gear shift progress step at a point in time when the slip (the slip having the first setting value or above) occurs and an engine torque are captured.

② During the kickdown shift, when an amount of slip of the engine clutch 130 that is computed from a difference between the number of resolutions of an engine and the number of resolutions of a P2 motor 140, desirably, an absolute value (|the number of resolutions of the engine−the number of resolutions of the P2 motor 140|) of the difference between the number of resolutions of the engine and the number of resolutions of the P2 motor 140 is higher than a previous maximum amount of the slip, a maximum amount of slip is updated, and a value resulting from the updating is stored as an engine clutch slip learning value.

③ A gear shift step at a learning ending point in time when an amount of slip of the engine clutch falls at or below a predetermined value (hereinafter referred to as a "second setting value") is captured.

④ A hydraulic value corresponding to the engine clutch slip learning value is retrieved from a dedicated map (a hydraulic compensation map) and is determined as the learning hydraulic value.

The program may be written in such a manner that the following steps are repeated. If the amount of the slip of the engine clutch 130 does not fall at or below the second setting value in the third step while learning is performed through the above-described sequence of process steps (learning steps), the amount of the slip of the engine clutch 130 is recomputed. When the computed amount of the slip of the engine clutch 130 is larger than the previous maximum amount of the slip, the maximum amount of slip is updated, and a value resulting from the updating is stored as the slip learning value for the engine clutch 130.

When the same kickdown shift situation occurs during the performance of the next time variable hydraulic control of the engine clutch 130, the learning hydraulic value derived through the above-described sequence of process steps (learning steps), as described above, is reflected as the compensation value (the hydraulic compensation value) in determining the final hydraulic pressure to be applied to the engine clutch 130 through the clutch actuator 160. The hydraulic compensation value here may be a value that results from multiplying the learning hydraulic value by the compensation factor.

The compensation factor may include an engine torque factor and an oil temperature factor. The engine torque factor may be a ratio (a value captured as a current engine torque/an engine torque at a learning entry point in time) between a current engine torque and an engine torque at a learning entry point in time. The oil temperature factor may be a value retrieved from an oil temperature map in which compensation factors, serving as factors for compensating for a delay in a response speed of the engine clutch 130 due to the oil temperature, are stored as values that vary with an oil temperature section.

Specifically, when a kickdown shift situation that is the same as the immediately preceding kickdown shift situation occurs during the performance of the variable hydraulic control, the controller 170 retrieves the learning hydraulic value that is derived through the described above sequence of process steps (learning steps) and is recorded in a storage device. In addition, the compensation factor (the engine torque factor and the oil temperature factor) is derived from the current engine torque and the oil temperature. The derived compensation factor is reflected in the retrieved learning hydraulic value, and thus the final hydraulic pressure is computed.

The computed final hydraulic pressure is applied in a gear shift section that is the same as a gear shift section (a section from the gear shift progress step at the point in time when the slip having the first setting value or above occurs to the gear shift progress step at the point when the slip falls at or below the second setting value) at a point in time when the learning hydraulic value is learned, and thus the engine clutch 130 is controlled. Accordingly, the slip that is to occur when the kickdown shift occurs during the performance of the variable hydraulic control is prevented.

For reference, the "gear shift progress step" means a gear shift phase that is assigned by the controller 170 in such a manner as to be expressed in the form of number according to a gear shift progress state when the gear shift is performed due to a change in the load on the vehicle at the user's request or during traveling. In the case of a general-purpose automatic transmission, although the number of steps varies according to transmission specifications, the gear shift phase is set in such a manner that once a gear shift command is issued, the gear shift is performed over 15 steps from when the gear shift is prepared to when the gear shift is completed.

It is assumed that, among the 15 steps, in the third step, learning is entered (a point in time when the slip having the first setting value or above occurs in the engine clutch 130) and that the learning ending point in time (a point in time when the slip of the engine clutch 130 falls at or below the second setting value) is set to be in the 13-th step. Under this assumption, for the reason describe above, the system for controlling an engine clutch according to the present disclosure controls the engine clutch 130 using the final hydraulic pressure in which the immediately preceding learning hydraulic value is reflected in the gear shift section from the third step to the 13-th step when the next time same gear shift situation (the kickdown shift during the performance of the variable hydraulic control) occurs.

Figure 4:
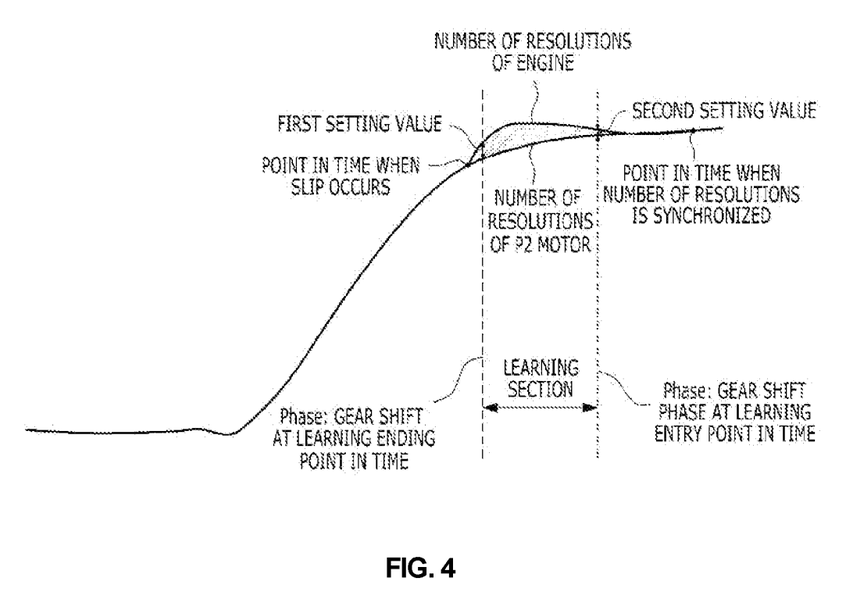
FIG. 4 is a graph illustrating changes in the number of resolutions of an engine and the number of resolutions of a P2 motor over time, which result when a kickdown shift occurs during performance of variable hydraulic control.

FIG. 4 is a graph illustrating changes in the number of resolutions of the engine and the number of resolutions of the P2 motor 140 over time, which result when the kickdown shift occurs during the performance of the variable hydraulic control, the graph being necessary to describe the embodiment of the present disclosure.

A portion (indicated by slashed lines) of FIG. 4 in which a difference between the number of resolutions of the engine and the number of resolutions of the P2 motor 140 occurs is a section in which the slip of the engine clutch 130 occurs during the kickdown shift. A point in time at which the difference between the two number of resolutions begins to fall at or above a predetermined value (the first setting value) is the learning entry point in time for deriving the above-described learning hydraulic value. A point in time when the difference between the two number of resolutions falls at or below a predetermined value (the second setting value) is the learning ending point in time.

At this point, the system for controlling an engine clutch according to the present disclosure captures the gear shift progress step (the gear shift phase) at each of the learning entry point in time and the learning ending point of time. Then, the system for controlling an engine clutch reflects the above-described learning hydraulic value for the engine clutch control in a gear shift section (a learning section in FIG. 3) that is the same as the previous gear shift section when the gear shift situation (the situation where the kickdown shift occurs during the performance of the variable hydraulic control) occurs under the same condition. Thus, the slip is in advance dealt with.

An engine clutch control process that is performed by the system for controlling the engine clutch of the above-described P2 type parallel hybrid vehicle will be described below with reference to a flowchart for control in FIG. 5. For convenience of description, constituent elements illustrated in FIGS. 1 and 2 are described with reference to reference numerals thereof.

Figure 5:
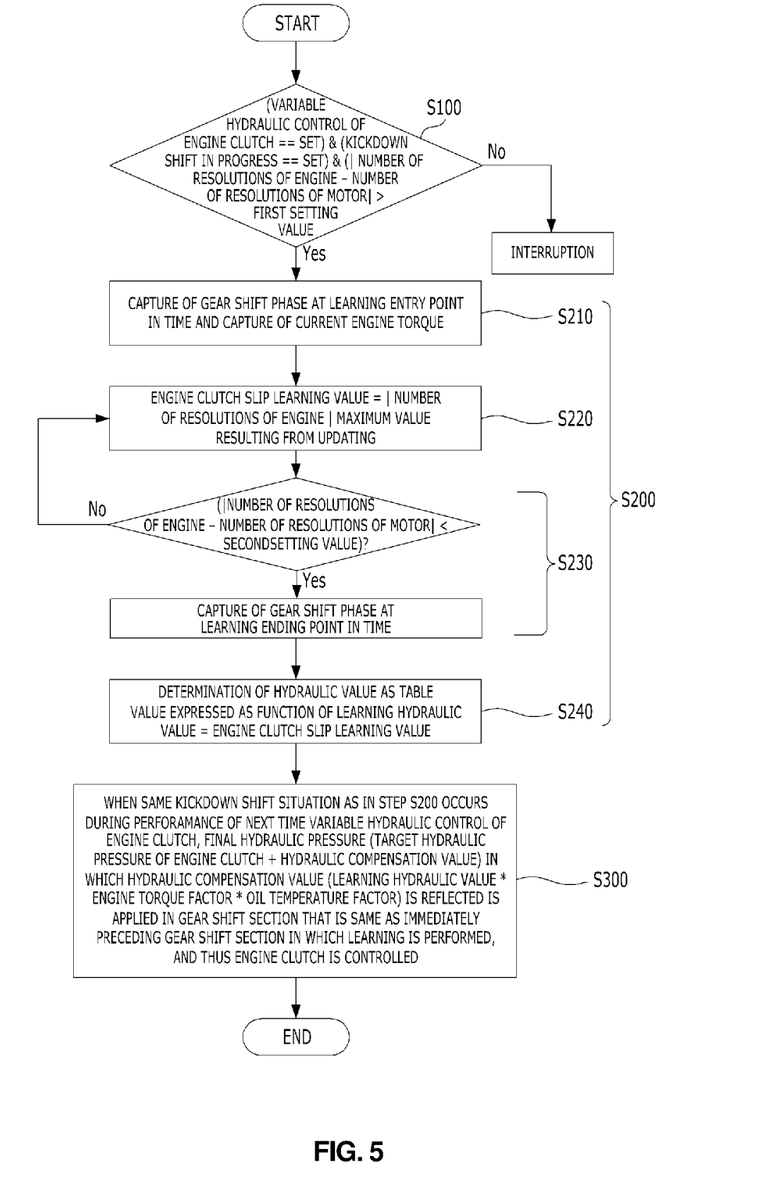
FIG. 5 is a flowchart for control illustrating a method of controlling an engine clutch of a P2 parallel hybrid vehicle according to an embodiment of the present disclosure.

With reference to FIG. 5, the engine clutch control process that is performed by the system for controlling the engine clutch of the above-described P2 type parallel hybrid vehicle starts with a condition determination step S100. In this step, it is determined whether or not a learning mode entry condition is satisfied, depending on whether or not the kickdown shift occurs during the performance of the variable hydraulic control of the clutch of the P2 type parallel hybrid vehicle and based on information on the slip of the engine clutch 130.

In the condition determination step S100, desirably, it may be determined that the learning entry condition is satisfied, when the kickdown shift occurs and when the amount of the slip of the engine clutch 130 due to the kickdown shift falls at or above the first setting value during the performance of the variable hydraulic control (control that gradually decreases a hydraulic pressure to be applied to the engine clutch 130) of the engine clutch 130 of the P2 type parallel hybrid vehicle.

A learning step S200 is performed when it is determined in the condition determination step S100 that a predetermined learning entry condition (the variable hydraulic control, the kickdown shift, and the occurrence of the slip having the first setting value or above) is satisfied. In the learning step S200, the learning hydraulic value for suppressing the slip that is to occur when the kickdown shift occurs in such a manner that the slip does not occur the next time same gear shift situation.

Specifically, the learning step S200 includes Step S210 of capturing the gear shift progress step (the gear shift phase) and the engine torque at the learning entry point in time and Step S220 of updating the maximum amount of the slip and storing the value resulting from the updating as the engine clutch slip learning value when the amount of the slip of the engine clutch 130 that is computed from the difference between the number of resolutions of the engine 110 and the number of resolutions of the P2 motor 140 is larger than the previous maximum amount of the slip during the kickdown shift.

In addition, the learning step S200 includes Step S230 of capturing the gear shift progress step (the gear shift phase) at the learning ending point in time when the amount of the slip of the engine clutch 130 falls at or below the second setting value and Step S240 of determining the learning hydraulic value corresponding to the engine clutch slip learning value using the dedicated map (the hydraulic compensation map). When the amount of the slip does not fall at or below the second setting value in Step S230, returning to Step S220 takes place, and Step S220 and subsequent steps are repeatedly performed.

After the learning is performed through Steps S210 and S240, when the same kickdown shift situation occurs during the performance of the variable hydraulic control of the engine clutch 130, an engine clutch control step S300 is performed. In the engine clutch control step S300, the final hydraulic pressure is computed by adding the hydraulic compensation value, obtained by multiplying the learning hydraulic value learned during a learning process ranging from Step S210 to Step S240 by the compensation factor, to the target hydraulic pressure, and the engine clutch is controlled using the computed final hydraulic pressure.

In Step S300, specifically, the final hydraulic pressure in which the hydraulic compensation value is reflected is applied in the gear shift section that is the same as the gear shift section (a section expressed as the learning section in FIG. 3) from the gear shift progress step (the gear shift phase) at the learning entry point in time in the previous learning step S200 to the gear shift progress step (the gear shift phase) at the learning ending point in time, and thus the engine clutch is controlled.

The compensation factor here may be configured to include the engine torque factor and the oil temperature factor. In this case, the engine torque factor is the ratio (the current engine torque/the engine torque at the learning entry point in time) between the current engine torque and the engine torque at the learning entry point in time, and the oil temperature factor is the factor for compensating for the delay in the response speed of the engine clutch. The oil temperature factor may be a value retrieved from the oil temperature map in which the compensation factors, serving as the factors for compensating for the delay in the response speed of the engine clutch 130 due to the oil temperature, are stored as the values that vary with the oil temperature section.

In a P2 type parallel hybrid vehicle in the related art, during the performance of the variable hydraulic control of the engine clutch 130, the slip may occur in the engine clutch 130 when the load on the vehicle is abruptly increased such as when the vehicle travels along the upward-inclined road, or when the kickdown shift occurs, such as when the operation for abrupt acceleration is performed. The slip in the engine clutch 130 is due to an abrupt change in the number of resolutions of the engine and in the engine torque. Thus, a decrease in acceleration takes place, and a sense of gear shift is not properly yielded.

By contrast, according to the present disclosure, during the performance of the variable hydraulic control of the engine clutch 130, when the kickdown shift occurs and when the slip occurs in the engine clutch 130, the compensation value (the hydraulic compensation value of the engine clutch 130) for preventing the slip in the next time same gear shift situation is derived through learning, and the compensation value is applied for the engine clutch control in the next time same gear shift situation. Thus, the clip can be effectively prevented or can be in advance dealt with.

Accordingly, based on the slip in the previous gear shift situation, the method and the system for controlling an engine clutch of a P2 type parallel hybrid vehicle according to the embodiments of the present disclosure in advance deal with the slip of the engine clutch that is to occur when the kickdown shift occurs during the performance of the variable hydraulic control. Thus, decreases in acceleration and drivability due to the slip of the engine clutch can be prevented, and gearshift quality can be improved.

Only the specific embodiments of the present disclosure is described above. However, it should be understood that the present disclosure is not limited to the specific embodiment described above and that all alterations, equivalents, and substitutions that fall within the nature and gist of the present disclosure are included in the scope of the present disclosure.

What is claimed is:

1. A method of controlling an engine clutch of a P2 type parallel hybrid vehicle, the method comprising:
    (a) determining whether or not a learning mode entry condition is satisfied, depending on whether or not a kickdown shift occurs during performance of variable hydraulic control of an engine clutch of the P2 type parallel hybrid vehicle and based on the degree to which slip of the engine clutch occurs;
    (b) deriving and storing a learning hydraulic value for suppressing the slip that is to occur when the kickdown shift occurs during the performance of the variable hydraulic control of the engine clutch in such a manner that the slip does not occur in the next time same kickdown shift situation, when a vehicle state satisfies a predetermined learning mode entry condition; and
    (c) computing a final hydraulic pressure by adding a hydraulic compensation value, obtained by multiplying the learning hydraulic value by a compensation factor, to a target hydraulic pressure, when the same kickdown shift situation occurs during the performance of the next time variable hydraulic control of the engine clutch, and controlling the engine clutch using the computed final hydraulic pressure.

2. The method of claim 1, wherein in the step (a), during the performance of the variable hydraulic control of the engine clutch of the vehicle, when the kickdown shift occurs and when an amount of slip of the engine clutch is at or above a first setting value, it is determined that the learning mode entry condition is satisfied.

3. The method of claim 1, wherein the step (b) further comprises:
    (b-1) capturing a gear shift progress step at a learning entry point in time and an engine torque;
    (b-2) updating a maximum amount of slip when an amount of slip of the engine clutch computed from a difference between the number of resolutions of an engine and the number of resolutions of a P2 motor is larger than a previous maximum amount of slip during the kickdown shift and storing a value resulting from the updating as an engine clutch slip learning value;
    (b-3) capturing a gear shift progress step at a learning ending point in time at which the amount of the slip of the engine clutch falls at or below a second setting value; and
    (b-4) determining a learning hydraulic value corresponding to the engine clutch slip learning value at the step (b-2) from a dedicated map.

4. The method of claim 3, wherein in the step (b-3), when the amount of the slip of the engine clutch does not fall at or below the second setting value, returning to the immediately preceding step (b-2) takes place, and the step (b-2) and the subsequent steps are repeatedly performed.

5. The method of claim 3, wherein when the same kickdown shift occurs during the performance of the next time variable hydraulic control of the engine clutch, in the step (c), the final hydraulic pressure is applied in a gear shift section that is the same as a gear shift section from the gear shift progress step at the previous learning entry point in time to the gear shift progress step at the learning ending point in time, and thus the engine clutch is controlled.

6. The method of claim 1, wherein the compensation factor comprises:
    an engine torque factor; and
    an oil temperature factor.

7. The method of claim 6, wherein the engine torque factor is a ratio between a current engine torque and an engine torque at a learning entry point in time, and the oil temperature factor is determined from an oil temperature map in which compensation factors, serving as factors for compensating a delay in a response speed of the engine clutch due to an oil temperature, are stored as values that vary with an oil temperature section.

8. A system for controlling an engine clutch of a P2 type parallel hybrid vehicle in which an engine, a motor, and a transmission are arranged in a row and in which an engine clutch is mounted between the engine and the motor, the system comprising:
    a clutch actuator providing a hydraulic pressure necessary to drive the engine clutch;
    a torque measurement unit measuring a torque of the engine;
    an oil temperature measurement unit measuring an oil temperature inside the engine clutch; and
    a controller computing a target hydraulic pressure to be applied to the engine clutch from pieces of information provided by the engine torque measurement unit and the oil temperature measurement unit and controlling operation of the clutch actuator based on the computed target hydraulic pressure,
    wherein the controller derives a learning hydraulic value for suppressing slip, through learning and stores the derived learning hydraulic value, when a kickdown shift occurs during performance of variable hydraulic control of the engine clutch and when the slip having a predetermined value or above occurs in the engine clutch, and the controller computes a final hydraulic pressure by adding a hydraulic compensation value, obtained by multiplying the learning hydraulic value by a compensation factor, to a target hydraulic pressure, when the same kickdown shift situation occurs during the performance of the next time variable hydraulic control of the engine clutch, and controls the engine clutch using the computed final hydraulic pressure.

9. The system of claim 8, wherein the controller captures a gear shift progress step at a point in time when the kickdown shift occurs and when slip having a predetermined value or above occurs in the engine clutch during the performance of the variable hydraulic control of the engine clutch and captures an engine torque, the controller updates a maximum amount of slip when an amount of slip of the engine clutch computed from a difference between the number of resolutions of an engine and the number of resolutions of a P2 motor is larger than a previous maximum amount of slip during the kickdown shift and stores a value resulting from the updating as an engine clutch slip learning value, the controller captures a gear shift progress step at a learning ending point in time at which the amount of the slip of the engine clutch falls at or below a predetermined value, and the controller retrieves a hydraulic value corresponding to the engine clutch slip learning value from a dedicated map and determines the retrieved hydraulic value as the learning hydraulic value.

10. The system of claim 9, wherein the controller repeats a process in which the amount of the slip of the engine clutch is recomputed when the amount of the slip of the engine clutch does not fall at or below the predetermined value, and in which a maximum amount of the slip is updated and a value resulting from the updating is stored as an engine clutch slip learning value, when the computed amount of the slip of the engine clutch is larger than a previous maximum amount of the slip.

11. The system of claim 9, wherein when the same kickdown shift situation occurs during the performance of the next time variable hydraulic control of the engine clutch, the controller applies the final hydraulic pressure in a gear shift section that is the same as a gear shift section from the gear shift progress step at the point in time when the slip having the predetermined value or above occurs to the gear shift process step at the learning ending point in time, and thus controls the engine clutch.

12. The system of claim 8, wherein the compensation factor comprises:
   an engine torque factor; and
   an oil temperature factor.

13. The system of claim 12, wherein the engine torque factor is a ratio between a current engine torque and an engine torque at a learning entry point in time, and the oil temperature factor is determined from an oil temperature map in which compensation factors, serving as factors for compensating a delay in a response speed of the engine clutch due to an oil temperature, are stored as values that vary with an oil temperature section.

* * * * *